United States Patent
Buschmann et al.

(10) Patent No.: US 7,034,673 B2
(45) Date of Patent: Apr. 25, 2006

(54) METHOD FOR MONITORING AN ELECTROHYDRAULIC VEHICLE BRAKING SYSTEM

(75) Inventors: Gunther Buschmann, Idstein (DE); Robert Schmidt, Rennerod (DE); Thorsten Ullrich, Gernsheim (DE)

(73) Assignee: Centinental Teves AG & Co., OHG, Frankfurt (DE)

( * ) Notice: Subject to any disclaimer, the term of this patent is extended or adjusted under 35 U.S.C. 154(b) by 121 days.

(21) Appl. No.: 10/492,097

(22) PCT Filed: Oct. 7, 2002

(86) PCT No.: PCT/EP02/11222

§ 371 (c)(1),
(2), (4) Date: Apr. 8, 2004

(87) PCT Pub. No.: WO03/033324

PCT Pub. Date: Apr. 24, 2003

(65) Prior Publication Data

US 2004/0260486 A1  Dec. 23, 2004

(30) Foreign Application Priority Data

Oct. 12, 2001  (DE) ............................... 101 50 583
Sep. 26, 2002  (DE) ............................... 102 44 762

(51) Int. Cl.
*B60Q 1/00* (2006.01)

(52) U.S. Cl. ................ 340/453; 340/451; 340/452; 340/454; 188/1.11 L; 188/1.11 R; 188/71.7

(58) Field of Classification Search .................. None
See application file for complete search history.

(56) References Cited

U.S. PATENT DOCUMENTS

| | | | |
|---|---|---|---|
| 3,997,887 A * | 12/1976 | Poynter | 137/806 |
| 4,201,974 A * | 5/1980 | Fima | 340/454 |
| 4,345,672 A * | 8/1982 | Nakasu | 188/1.11 R |
| 4,749,063 A * | 6/1988 | Garrett et al. | 188/1.11 E |
| 5,767,397 A | 6/1998 | Eisele | |
| 5,848,672 A * | 12/1998 | Brearley et al. | 188/1.11 L |

(Continued)

FOREIGN PATENT DOCUMENTS

DE  19603867  8/1997

(Continued)

OTHER PUBLICATIONS

Search Report of the German Patent Office for Appln 10244762.4.

*Primary Examiner*—Daniel Wu
*Assistant Examiner*—Son Tang

(57) ABSTRACT

Method for monitoring an electrohydraulic braking system. The volume uptake is determined by the elasticity within the wheel brake that is subjected to certain fluctuations, on the one hand, and to a much greater degree by the clearance that is present, on the other hand. To make a reliable statement relating to the air charge, an estimation of the current clearance is first made, taking three ranges into consideration. If there is a normal clearance, a top evaluation threshold is taken as a basis, which assumes the clearance lies at the upper end of the normal range. When said evaluation threshold is exceeded, an alarm is triggered. If the clearance is assumed to lie at the bottom limit of the normal range, a bottom evaluation threshold applies, however, an alarm is only triggered in this case this situation has occurred several times in succession.

8 Claims, 1 Drawing Sheet

U.S. PATENT DOCUMENTS

| | | | |
|---|---|---|---|
| 6,003,640 A * | 12/1999 | Ralea | 188/71.5 |
| 6,186,599 B1 * | 2/2001 | Otomo et al. | 303/20 |
| 6,397,977 B1 * | 6/2002 | Ward | 188/1.11 L |
| 6,554,108 B1 * | 4/2003 | Bohm | 188/1.11 E |
| 6,749,271 B1 * | 6/2004 | Mayr-Frohlich et al. | 303/114.3 |

FOREIGN PATENT DOCUMENTS

| | | |
|---|---|---|
| DE | 10060225 | 10/2001 |
| WO | 9941125 | 8/1999 |
| WO | 0172568 | 10/2001 |

* cited by examiner

METHOD FOR MONITORING AN ELECTROHYDRAULIC VEHICLE BRAKING SYSTEM

TECHNICAL FIELD

The present invention generally relates to a method for monitoring an electrohydraulic braking system for vehicles and more particularly relates to a method for monitoring an electrohydraulic braking system for vehicles in view of the enrichment of brake fluid contained therein with a gas.

BACKGROUND OF THE INVENTION

DE 100 60 225 A1 generally discloses a method of this type, wherein both the wheel braking pressure and the volume uptake of the wheel brakes is determined in a braking operation. The determined values are compared with a previously defined evaluation threshold in a p/v diagram, and an alarm signal is triggered and output when the evaluation threshold is exceeded.

A monitoring arrangement of this type is of extreme importance above all for an electrohydraulic vehicle braking system wherein the brake fluid may become contaminated with gases, e.g. air or steam, in the course of time. The result is that the per se incompressible brake fluid becomes compressible. The consequence, in turn, is that considerably more brake fluid must be conducted into the braking system for reaching a defined wheel braking pressure than this would be the case regarding a normal (i.e. uncontaminated) brake fluid with low compressibility. In a braking system where the brake fluid is conducted from a pedal-operated master brake cylinder into the wheel brakes it is possible for the driver to determine himself/herself that the pedal travel is becoming longer and that the "feel" of the brakes becomes inexact when the brake fluid is charged with air or gases. This 'monitoring' possibility is lost in an electrohydraulic braking system. This is because with a wheel system of this type the wheel brakes are connected to a high-pressure accumulator by means of valves for build-up of a wheel braking pressure. A pressure in conformity with the driver's request can be built up in the wheel brakes by appropriately actuating the valves. Because an unlimited pressure fluid quantity is principally available in the high-pressure accumulator, which is equipped with pumps in addition, it is possible to build up a sufficiently high braking pressure even with compressible gasses present in the brake fluid without a changing pedal feel. In this case, the driver is unaware of the contamination of the brake fluid with air.

Admittedly, an electrohydraulic braking system of this type generally includes also a master brake cylinder, which is normally separated from the wheel brakes though and becomes connected with said only if the pressure supply by way of the high-pressure accumulator fails. Besides, the pedal-operated master brake cylinder is required to determine the driver's request concerning a defined vehicle deceleration. To this end, among others the force is determined used by the driver to depress the brake pedal.

The situation becomes problematic when the electrohydraulic part of the braking system fails and the wheel brakes become hydraulically connected to the master brake cylinder to build up braking pressure in a conventional fashion by application of the brake pedal. In this case, the volume of the master brake cylinder will no longer be sufficient to build up an appropriately high braking pressure with the compressible brake fluid. Also, it is not possible to increase the size of the master brake cylinder as desired, because its length is limited by the maximum possible pedal travel and its diameter is limited by the pedal force the driver can maximally apply.

Therefore, it is absolutely necessary to monitor an electrohydraulic vehicle braking system of the above-mentioned type with respect to the compressibility of the brake fluid, that means especially with respect to the contamination of the brake fluid with gas or air.

However, the following problem is encountered when realizing a monitoring mechanism: The volume uptake is determined by the elasticities within the vehicle brake and its supply lines. These elasticities are specific for the braking system of a defined vehicle and are subject to defined tolerances under aspects of manufacture. These tolerances are easily accounted for and may therefore be easily taken into account when determining the evaluation threshold. Apart from the elasticities of the vehicle brake, however, there is also a clearance, that means the distance which the actuating members of a braking system (e.g. the brake pistons of a disc brake system) must cover before a braking effect commences. This clearance is constantly changing within a relatively wide range. Among other things, this has two reasons. On the one hand, the resetting members meant to adjust a small clearance after a braking operation, do not act precisely. On the other hand, the actuating members are floatingly supported so that the accelerations of the vehicle cause displacement of the actuating members. Thus, e.g. the actuating pistons of a disc brake system, which are generally arranged transversely to the longitudinal vehicle axle, are pulled away from the brake disc by high lateral acceleration forces. However, vibrations of the vehicle due to rough road conditions can also cause a change of the clearance. The clearance resulting is referred to as a dynamic clearance.

The detectable variations of the clearance are in the same order as the changes appearing due to an air burden. In a method wherein the volume uptake at a defined braking pressure is measured, it is therefore initially impossible to make a distinction whether this volume uptake has been caused by a large clearance or by a major intake of air or gas.

To avoid spurious alarms, the evaluation threshold must be set such that an alarm is prevented even with an accidentally large clearance. However, the result would be that the method is relatively insensitive. It may occur that a great air burden is not detected because based on a small clearance, the evaluation threshold is not reached in spite of a great air burden.

BRIEF SUMMARY OF THE INVENTION

Thus, an object of the invention is to provide a method acting with a sufficient rate of sensitivity and reliably detecting enrichments of air in the brake fluid, and to prevent the triggering of spurious alarms nevertheless.

To achieve this object, the invention provides that initially the size of the current clearance is estimated which lies within or outside a normal range marked by a top and a bottom limit, the method knows two evaluation thresholds, i.e. a top evaluation threshold where a clearance at the top limit of the normal range is taken into consideration, and a bottom evaluation threshold lying thereunder, an alarm is triggered in the event of a current size of the clearance in the normal range if the volume uptake lies above the top evaluation thresholds, and an alarm is triggered in the event of a current size of the clearance at the bottom limit or thereunder, if the volume uptake lies about the bottom evaluation thresholds and such a situation has occurred at least once directly beforehand.

The invention is based on the following reflection: The clearance generally is within a normal range basically determined by the resetting of the brake actuating member that differs from braking to braking. In addition, there are displacements of the actuating member in terms of increasing or decreasing the clearance, as they occur on asphalted roads and with a usual way of driving. A top evaluation threshold may be defined this way, and it is assumed that the clearance is at the top limit of the normal range.

Further, a bottom evaluation threshold can be defined, the amount of which lies below the top evaluation threshold and takes into account a clearance that is rather in the bottom range or at the bottom limit of the normal range. When the clearance is now determined or estimated, the top evaluation threshold can be taken into consideration for a comparison with the measured volume uptake related to a defined wheel braking pressure as long as the current clearance is in the normal range.

When the result of the estimation is that the clearance lies rather at the bottom limit or even below it, the bottom evaluation threshold is used for the comparison of the current volume uptake, while, however, a statistic evaluation is made, meaning that an alarm is only triggered if this situation occurs several times in succession. This is done for the following reasons:

Clearances at the bottom limit are produced after a braking operation and determined especially by the extent of resetting. Yet said resetting underlies statistic fluctuations. In individual cases the extent of resetting will be so that the bottom evaluation threshold is exceeded even if the brake fluid is not enriched with air. In most cases, however, resetting will be in a medium range so that the bottom evaluation threshold will only be exceeded if air enrichment prevails.

To avoid spurious alarms because resetting accidentally turned out as relatively significant, provisions are made that the alarm is triggered only if the bottom evaluation threshold has been exceeded twice or several times in succession.

The invention further arranges that an alarm is omitted in case the assessment of the clearance results in a value above the top limit, even if the volume uptake lies above the top evaluation threshold. This exceptional provision permits leaving the situation out of account that very large clearances can occur when fixing the top evaluation threshold.

The driving dynamics of the vehicle can be constantly monitored to estimate the size of the clearance, and exceeding of a driving dynamics limit value is interpreted as a clearance prevailing above the normal range. These driving dynamics limit values can also relate to different situations, e.g. the lateral acceleration can be constantly monitored. In the event of high lateral accelerations, e.g. above 4 m/sec$^2$, which generally occur only in extreme cornering maneuvers and are normally avoided by the driver in normal driving maneuvers, it can be assumed that a great clearance has developed.

As long as high lateral accelerations are not measured, it is assumed that the clearance is in the normal range.

Another reason for large clearances are vibrations of the vehicle produced by a rough road section. This becomes conspicuous in major fluctuations of the wheel speed. Thus, a constant measurement of the wheel speed allows concluding the quality of the road section. In this case, too, it is possible to introduce defined criteria permitting to assume that a large clearance is very likely to exist.

Of course, a large clearance caused by such driving dynamics situations is assumed to exist only as long as it has not been caused to readopt a normal value by means of a braking operation, be it initiated by the driver or automatically effected by the system.

Directly after a braking operation it is assumed that the clearance is in the range of the bottom limit of the normal range or even below it, so that a corresponding assessment is made the basis of the method. What counts in this case is the bottom evaluation threshold, as explained hereinabove, that means, said threshold must be exceeded two times or several times in succession to conclude an increased air enrichment of the brake fluid.

A braking operation reducing the clearance will only be initiated if no driving dynamics values lying above the driving dynamics limit value are detected for a certain period of time. It shall be avoided this way that braking operations are performed during cornering or on a rough road section, which could lead to an uncontrolled condition of the vehicle. It is rather aimed at reducing the clearance only if this unusual driving situation is undoubtedly over.

DETAILED DESCRIPTION OF THE PREFERRED EMBODIMENTS

Figure 1:
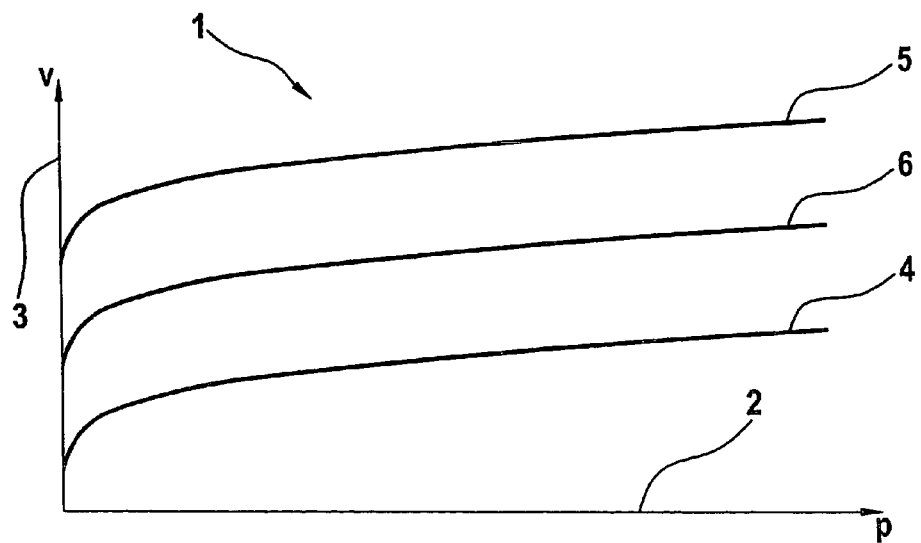
FIG. 1 is a p/v diagram.
Figure 2:
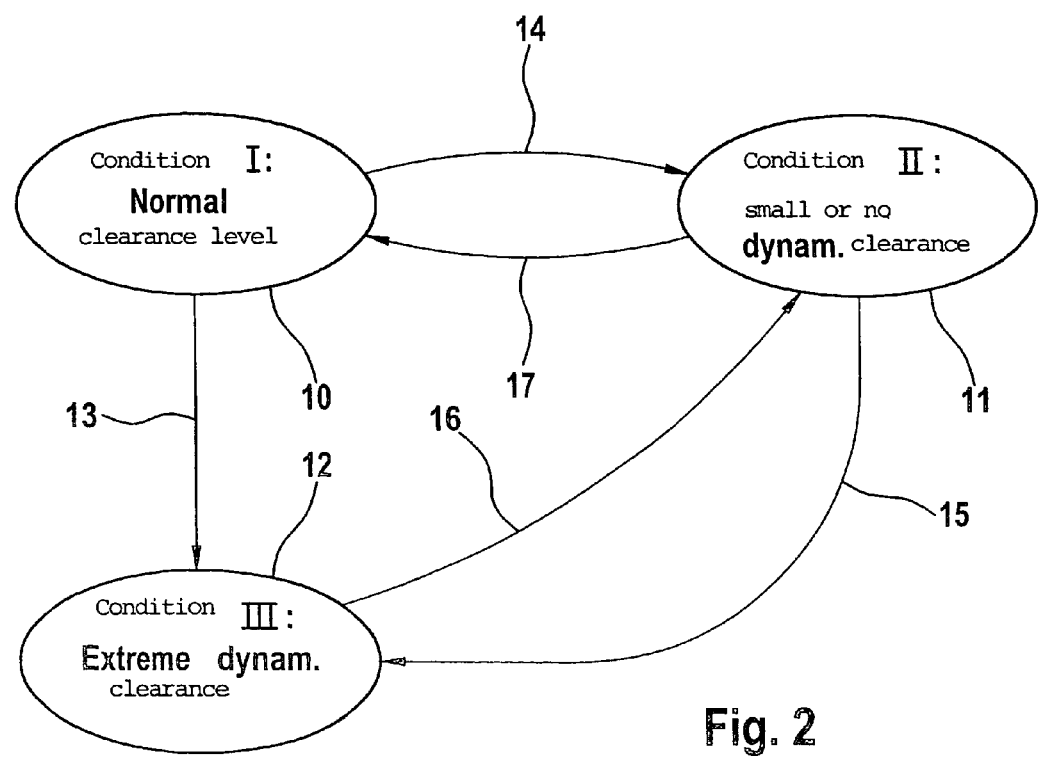
FIG. 2 depicts the transitions between various conditions of the clearance.

Reference is initially made to FIG. 1. This embodiment shows a p/v diagram 1, with the wheel braking pressure p being plotted on the X-axis 2 and the volume uptake v of the wheel brake being plotted on the Y-axis 3. When a wheel brake is referred to in this connection, the entire hydraulic system is meant thereby, beginning from the actual brake members until the pressure fluid source. The volume uptake of this system results from the provision of elastic components. Thus, e.g. the brake line expands when subjected to pressure load. The same applies to a brake caliper. As the latter must support the pressure that acts on the brake disc, it thereby expands, with the result that the pressure fluid chambers behind the brake pistons increase. Because these effects depend on the wheel braking pressure, a defined volume uptake responsive to the wheel braking pressure results when the brake fluid is incompressible. The volume uptake is increased once more when the brake fluid becomes compressible due to being contaminated by air or gases, that means the brake fluid decreases its volume under pressure load.

Accordingly, the p/v diagram of FIG. 1 shows a normal curve 4 wherein the tolerance variations to be expected with respect to the elasticity within the braking system are taken into consideration.

A top curve corresponds to a top evaluation threshold 5, wherein in addition to the tolerances, as they are considered in the normal curve 4, also a maximum clearance within a normal range is taken into account. Unusual clearances that lie outside the normal range and are caused by unusual circumstances such as high lateral accelerations of the vehicle during cornering maneuvers or strong vibrations of the vehicle on a rough road section are not taken into consideration herein.

A medium curve shows a bottom evaluation threshold 6 where a medium clearance within the normal range has been considered.

The wheel brake can be in different conditions corresponding to illustration 2. Condition I (to which circle 10 relates) is characterized by a normal clearance level. Condition II is characterized by a small or no dynamic clearance (circle 11), and condition III is characterized by an extreme dynamic clearance (circle 12).

Upon start of the electrohydraulic braking system (e.g. ignition start or during a so-called waking by means of other signal sources), the method at first is based on that the brakes are in the condition III, that means, there is a clearance above the normal range.

This assumption is necessary because there is no information about possible manipulations of the clearance condition when the braking system is disabled. For example, a large dynamic clearance can remain after brake maintenance work.

Condition III is left when braking by the driver has been performed or an active clearance reduction took place caused by an automatically initiated, hardly perceptible braking operation. In this case, clearance condition II is referred to (transition according to arrow 16).

Based on clearance condition I, the braking operation of a driver or an active clearance reduction will also lead to condition II (transition according to arrow 14).

Since it has to be assumed that the clearance will increase again on account of always existing vibrations, the transition from condition II to condition I according to arrow 17 will take place after a certain time with a driving speed other than zero, or a defined number of wheel rotations, respectively. This transition of conditions takes place also when a certain, but not yet extreme lateral acceleration is observed.

Based on the conditions I or II (arrows 13, 15), a change into condition III takes place when defined driving dynamics limit values, for example a lateral acceleration limit, have been exceeded or extreme fluctuations of the wheel speeds indicative of driving on a rough road section have been monitored.

The clearance can be estimated with respect to the three conditions on account of the different transitions according to arrows 13 to 17, respectively occurring due to an evaluation of the constantly measured driving dynamics: When the clearance is in condition III, the air enrichment is not monitored, and the sole reason for this is because exceeding of the top threshold evaluation curve corresponding to the top evaluation threshold 5 is due to precisely this large clearance prevailing rather than to a great air burden. If, however, the clearance is in condition I, it can be stated with some certainty that exceeding of the top evaluation threshold 5 during braking is due to the fact that the brake fluid is burdened with air. Therefore, an alarm is triggered.

This alarm may comprise an optical and acoustic signal. Upon exceeding, this can also imply that the vehicle cannot be started again after such an alarm, or only in a significantly limited extent, so that it is. e.g. possible to drive at low speeds to a repair shop where the brake fluid can be replaced.

When condition II prevails, i.e. a small clearance or no dynamic clearance, the bottom evaluation threshold 6 is taken into account for evaluation. Exceeding of this evaluation threshold in a particular case may be due to the fact that actually a relatively large clearance has developed again after a driver's braking operation or an active clearance reduction. However, this is likely to occur relatively rarely on a statistical average so that it may be assumed that a more frequent occurrence of the exceeding of the bottom evaluation threshold 6 in the end is due to an air burden, which in turn triggers a corresponding alarm.

The method presented is advantageous because customary sensors can be used. Usually, an electrohydraulic braking system also comprises means for driving dynamics control. Said control requires information about the lateral acceleration of the vehicle that can be detected by means of a corresponding sensor.

The electrohydraulic braking system is furthermore used to perform an ABS control operation. Information about the rotational behavior of the wheels is required for this purpose. The wheel sensors provided for this purpose are generally known in the art and can be used to detect the wheel rotational speed and its fluctuations.

Various pressure sensors are provided for controlling the system itself. The pressure sensors also measure directly the pressure in the wheel brakes.

Further, the volume removal from the accumulator, which corresponds to the volume uptake of the wheel brakes, can be measured directly or estimated very accurately by appropriate methods, such as by monitoring the switching times of valves or the pump's rate of delivery, so that it can be found out how large the brake fluid volume is that has been conveyed into the wheel brakes.

The invention claimed is:

1. Method for monitoring an electrohydraulic braking system for vehicles in view of the contamination of brake fluid with air, with the braking system including a pressure accumulator with brake fluid and at least one hydraulic wheel brake having a clearance of a variable quantity, wherein the wheel brake is connected to the pressure accumulator, with the result that a braking pressure is produced therein, comprising the steps of:
   (1) determining a pressure in at least one wheel brake,
   (2) determining the volume uptake of the at least one wheel brake,
   (3) initially estimating the size of the current clearance which lies within or outside a normal range marked by a top and a bottom limit,
   (4) estimating a top evaluation threshold where the clearance is taken into consideration at the top limit of the normal range, and a bottom evaluation threshold lying thereunder,
   (5) triggering an alarm if the current clearance is within in the normal range and if the volume uptake lies above the top evaluation threshold, and
   (6) triggering an alarm if the current clearance is at or under the bottom limit, and if the volume uptake lies generally about the bottom evaluation thresholds and a similar situation has occurred at least once directly beforehand.

2. Method as claimed in claim 1, wherein no alarm is triggered when the current size of the clearance is above the top threshold, irrespective of the volume uptake.

3. Method as claimed in claim 1, wherein one or more driving dynamic of the vehicle is constantly monitored, wherein the exceeding of a driving dynamics limit value is interpreted as a clearance prevailing above the normal range.

4. Method as claimed in claim 3, wherein the lateral acceleration of the vehicle is constantly monitored, and in that exceeding of a lateral acceleration limit value is interpreted as exceeding of the driving dynamics limit value.

5. Method as claimed in claim 3, wherein the rotational speed of the vehicle is constantly measured, and in that a great fluctuation of the rotational speed that repeats in a defined period is interpreted as exceeding of the driving dynamics limit value.

6. Method as claimed in claim 3, wherein it is assumed for a defined period after a braking operation that the clearance is at a bottom limit or below.

7. Method as claimed in claim 1, wherein when a clearance above the normal range is detected, a braking operation for reducing the clearance is initiated.

8. Method as claimed in claim 7, wherein the braking operation reducing the clearance is initiated only when no driving dynamics values lying above the driving dynamics limit value have been detected for a defined period.

* * * * *